(12) United States Patent
Scogin et al.

(10) Patent No.: US 6,527,970 B1
(45) Date of Patent: *Mar. 4, 2003

(54) MICROBIOLOGICAL AQUEOUS FILM FORMING FOAM (AFFF) FIRE-FIGHTING FORMULATION

(75) Inventors: William L. Scogin, Houston, TX (US); Charles S. Cox, deceased, late of Houston, TX (US), Kathryn N. Cox, surviving widow

(73) Assignee: Verde Environmental, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,559

(22) Filed: Nov. 3, 1999

Related U.S. Application Data

(63) Continuation-in-part of application No. 09/256,010, filed on Feb. 23, 1999, now Pat. No. 6,225,362, which is a continuation-in-part of application No. 08/688,806, filed on Jul. 31, 1996, now Pat. No. 5,942,552, which is a continuation-in-part of application No. 08/372,758, filed on Jan. 13, 1995, now Pat. No. 5,658,961, which is a continuation-in-part of application No. 08/285,935, filed on Aug. 4, 1994, now abandoned.

(51) Int. Cl.$^7$ .................................................. A62D 1/00
(52) U.S. Cl. .............................. 252/3; 252/2; 424/93.4; 521/65
(58) Field of Search .............................. 521/65; 252/2, 252/3; 424/93.4

(56) References Cited

U.S. PATENT DOCUMENTS

| | | | |
|---|---|---|---|
| 4,288,545 A | 9/1981 | Spraker | 435/42 |
| 4,482,632 A | 11/1984 | Spraker | 435/253 |
| 4,810,385 A | 3/1989 | Hater et al. | 435/292 |
| 5,133,991 A | 7/1992 | Norman et al. | 427/405 |
| 5,225,095 A | 7/1993 | Di Maio | 252/307 |
| 5,637,499 A * | 6/1997 | Turick | 435/244 |
| 5,658,961 A | 8/1997 | Cox | 521/65 |
| 5,879,928 A * | 3/1999 | Dale et al. | 435/255.1 |
| 5,942,552 A | 8/1999 | Cox | 521/65 |

OTHER PUBLICATIONS

Bioremediation for Marine Oil Spills, Office of Tech. Assessment Industrial Fire World Magazine, Letter to Editor, p. 39, Aug. 1994.

* cited by examiner

*Primary Examiner*—John M. Cooney, Jr.
(74) *Attorney, Agent, or Firm*—John W. Montgomery; Haynes and Boone, LLP

(57) ABSTRACT

A microbiological fire-fighting foam formulation which comprises a bioremediating component and a surfactant, the bioremediating component consisting substantially of sporulating bacteria which are tolerant of the surfactant used. The surfactant selected being innocuous to the bioremediating component used both when the microbes are in a spore state and when activated, and the selected surfactants further being biodegradable by the microbes of the microbial solution. An improved embodiment comprises a fluorinated film forming foam surfactant to increase the fire fighting capabilities while retaining bioremediation capabilities. The improved formulation enables microbiological digestion to inert volatile organic compounds and hydrocarbons of the formulation or of the fuel for the fire that may be ablaze when the formulation is applied.

32 Claims, No Drawings

MICROBIOLOGICAL AQUEOUS FILM FORMING FOAM (AFFF) FIRE-FIGHTING FORMULATION

This is a Continuation-In-Part application of prior patent applications: Ser. No. 09/256,010, filed Feb. 23, 1999 which is now U.S. Pat. No. 6,225,362, Ser. No. 08/688,806, filed Jul. 31, 1996 and issued as U.S. Pat. No. 5,942,552; Ser. No. 08/372,758, filed Jan. 13, 1995 and issued as U.S. Pat. No. 5,658,961; and Ser. No. 08/285,935, filed Aug. 4, 1994, now abandoned.

FIELD OF THE INVENTION

The present invention relates to an improved formulation both for extinguishing fires and for decomposing (bioremediating) residual organic materials, including hydrocarbons, that were fueling the fire or that continue to create a hazard after the fire is extinguished. In particular, the present invention relates to an aqueous film forming foam (AFFF) fire-fighting formulation that also biodegrades in situ the residual hydrocarbons remaining at a fire site after the fire is extinguished, including biodegrading certain of the components of the fire-fighting formulation.

BACKGROUND OF THE INVENTION

Without limiting the scope of the invention, its background is described in connection with uses of foaming concentrates for use as fire-fighting agents. Foaming concentrates for use as fire-fighting agents have been known and used since before 1940. Additional ingredients are added to such concentrates for a variety of reasons. For example, because such concentrates contain organic or proteinaceous foaming agent, microbicides (bactericides) are added to the concentrate to kill or prevent bacteria which would decay the foaming agent. Some typical foam fire-fighting formulations produce a foam that may persist for up to several days. Persistent foams have utility for such applications as temporary covers for landfills and waste piles, vapor barriers for spills of hazardous materials, and crop protection against frost. The presence of a bactericide in the foam to prevent the decomposition of the foam by bacteria promotes the persistence of the foam.

Examples of protein hydrolysates as a constituent of prior art foam formulations include U.S. Pat. No. 5,225,095 to DiMaio, and also U.S. Pat. No. 5,133,991 to Norman et al. Because these hydrolysates are excellent nutrient sources for microbiological life forms, a low-level toxicity microbicide or bactericide is usually recommended as an additive to preserve the concentrate. The fact that most foams are susceptible to microbial decomposition provides a basis for the conclusion that the art of fire-fighting foams teaches against the inclusion of microbial life forms in their formulations.

Organics decomposing microorganisms have been commercially available to clean oil spills from oil tankers and to assist in waste removal from grease interceptors in restaurants for some time now. Microbes specifically engineered for the decomposition of difficult organic compounds are well known and readily available.

Investigation of microbial degradation of oil dates back to at least 1942, when the American Petroleum Institute began to subsidize research in the field. Considerable basic knowledge about factors that affect natural biodegradation, the kinds of hydrocarbons capable of being degraded, and the species and distribution of the microorganisms involved in biodegradation had already been developed in the early 970s. For instance, the Office of Naval Research sponsored more than a dozen basic and applied research projects in the late 1960s and early 1970s on oil biodegradation to control marine oil spills. Since this time, a large number of refineries, tank farms, and transfer stations now employ in situ bioremediation to restore land contaminated by accidental spills of fuel oil or other hydrocarbons.

An important series of field tests of the use of fire-fighting foam to control organics and hydrocarbon fires were conducted in the aftermath of the Persian Gulf War. The oil field fires created an environment of urgency and necessity which focused creative minds on solving the problems at hand, and on concentrating on research and development to solve some of the problems anticipated to occur again in the future.

The difficulties encountered in incorporating microbe cultures in a fire-fighting foam solution which will extinguish organically fueled fires and begin the disposal of the residual hydrocarbon waste products were many. The first challenge was the selection of a hardy strain of organics-consuming (primarily hydrocarbon-consuming) microorganisms that can withstand the extremely severe environment associated with organically fueled fires in a proportion sufficient to adequately address the magnitude of the overall bioremediation challenge presented. A second challenge was determining the specific organism that digest or decompose a particular grease or oil and yet remain capable of being stabilized so that they have a satisfactory shelf life thereby being available when needed. A third challenge was the selection of a microbial strain that be stable in surfactant mixtures strong enough to extinguish the fire.

A need, therefore, exists for a bioremediating fire-fighting foam mixture and a method for the decomposition of organic materials which meets the challenges presented in order to reduce cleanup costs and increase the quality of the cleanup by providing an effective and environmentally safe means to do so.

SUMMARY OF THE INVENTION

The object of the present invention is to provide effective fire-fighting formulations that initiate bioremediation of the site of the fire. Generally, the invention is an aqueous formulation which includes preselected bioremediation agents in a fire-fighting foam-forming composition.

In one embodiment of the present invention, a composition for extinguishing fires and bioremediating a fire site is provided comprising a foam-forming surfactant component and a bioremedial component comprising one or more sporogenous nonpathogenic bacteria species. By foam-forming surfactant component is meant one or more surfactants including if desired mixtures of surfactants including anionic, cationic, non-ionic, and amphoteric surfactants. Certain of these surfactants may be fluorinated surfactants that provide a film-forming foam.

The bioremediation component comprises a biological agent having the characteristics: 1) the ability to at least partially degrade flammable organic materials; 2) the ability to remain viable in fire-fighting, foam-forming and the film-forming foam formulations; and 3) lack of pathogenicity in humans of normal vulnerability. Suitable microorganisms utilized in one embodiment of the present invention may include, for example, sporogenous bacteria embodying the desired characteristics. Certain commercially available sporogenous Bacillus strains, for example, include Bacillus formulated by Sybron Chemicals, Inc. Bacillus are a gram-positive bacterium which, under certain conditions, are spore-forming. Examples of Bacillus strains effective in the practice of the invention in connection with the consumption of volatile organic compounds include but are not limited to *B. subtilis, B. licheniformis, B. polymyxa* (now *Paenibacillus polymyxa*), *B. amyloliquifaciens, B. pasteurii* and *B. laevolacticus.*

In addition, the selection among the above strains is advantageous because these species of Bacillus are not true pathogens as are the species *B. anthracis* and *B. cereus*. Reports of infections in man caused by Bacillus species other than *B. anthracis* and *B. cereus* are rare. According to a report by the Department of Biology of the Virginia Polytechnic Institute and State University, *B. subtilis, B. licheniformis*, and *B. polymyxa* as described by the manufacturer, Sybron, would not constitute a public health hazard unless the microorganisms were used in an area where individuals with an unusual vulnerability (such as with open wounds or immunodeficiency) would be exposed. Similarly, *B. amyloliquifaciens, B. pasteurii* and *B. laevolacticus* are considered not to constitute a public health hazard because they are not *B. anthracis* or *B. cereus* species.

Microorganisms (microbes) of the type used in the present invention are capable of assimilating and breaking down the non-soluble organic materials including hydrocarbons that compose grease and oil into relatively harmless substances of water-soluble products, carbon dioxide and a lesser quantity of fatty acids. The bacterial component may consist essentially of bacteria in aqueous solution or may include additional compounds such as surfactants, stabilizers, opacifiers, buffers, etc.

In one embodiment, the composition may include constituents designed to improve the film-forming characteristics of the foam. Surfactants comprising fluorinated surfactants are particularly advantageous because of their film-forming foam characteristics. The fluorinated, film-forming foam surfactant component may be a premixed solution comprising a number of constituents such as, for two examples not intended to be limiting as to the scope of the film-forming foam surfactant component, those represented by the surfactant formulations marketed under the trade names ZONYL FSA and LODYNE. In one embodiment, additional constituents designed to improve the integrity or homogeneity of the film-forming foam composition are added. Such additional constituents may include a solvent or water-based coupler such as for one example a glycol ether. A glycol ether found to be efficacious is diethylene glycol mono-butyl ether. Another additional constituent useful in certain formulations may be a polymer emulsifier or thickener, such as polysaccharide gum. One such polysaccharide gum found to be efficacious is a xanthan gum such as for example those marketed under the trade names KELZAN and XANVIS.

One particularly useful embodiment provides a composition comprising a fluorinated foam-forming surfactant component having a concentration of about 12–20% by volume in the composition, a concentration found to be efficacious is 15% LODYNE. This mixed in the inventive composition gives a total number of viable bacteria in the range of about $1 \times 10^9$ to about $5 \times 10^{11}$ per gallon in the final composition, a plurality species and quantity of such found to be efficacious is a mixture of *B. subtilis, B. licheniformis, B. polymyxa* (now *Paenibacillus polymyxa*), *B. amyloliquifaciens, B. pasteurii* and *B. laevolacticus* at a final concentration of about $6 \times 10^{10}$ viable bacteria per gallon of the final composition. This embodiment also includes a glycol ether at a of about 13–22% by volume in the composition, a glycol ether and concentration thereof found to be efficacious is 17% by volume diethylene glycol mono-butyl ether. This embodiment further includes a polysaccharide gum at a concentration of about 1–7% weight per volume in the composition, a xanthan gum such as that marketed under the trade name XANVIS at a concentration of 3.25 lbs/100 gallons of the final composition has been found to be efficacious.

Further provided is a method of simultaneously extinguishing a fire and bioremediating a site of the fire comprising the steps of applying to the fire a mixture comprising one or more foam-forming surfactants and a plurality of nonpathogenic sporogenous Bacillus species in sufficient quantity to seed the fire site after extinguishment of the fire and leaving at least a portion of the mixture at the fire site to effect bioremediation.

In an alternate embodiment, a foam-forming fire-fighting and bioremediating composition is provided comprising, in aqueous solution, a ALS foam-forming surfactant at a concentration of from about 30–40% by volume, a bioremediating bacterial component comprising from 10–25% per volume GC600L 6X, and a polysaccharide gum component comprising from 1–4% weight per volume of xanthan gum.

In alternate embodiments the invention may further provide inorganic nutrients in a concentration sufficiently small to avoid microbe activation in storage, stabilizers, emulsifiers, preservatives, or additional foaming agents, together with surfactants useful for extinguishing fires and bioremediating a fire site. Microorganisms in this mixture are stabilized until used and then activated when applied to waste organic compounds including hydrocarbons. The selection of specific activatable bioremediation agents, activatable microbes, microbe cultures, microorganisms, bacteria, spores, or sporogenous microbe strains could vary for additional efficacy, depending on the waste material to be remediated.

In broad practice, this invention comprises a bioremediating component in an aqueous solution and a fire-extinguishing component including a foaming agent. The organic materials that provide fuel for the fire also support the reproduction and growth of the microbe strains of the bioremediating component. They support the growth and reproduction of these strains when they are activated in the presence of such organic compounds and water. In one embodiment, the mixture contains from about 40% to about 50% by volume of water, from about 30% to about 40% by volume foaming agent and from about 16% to about 20% by volume of premixed microbe solution. One embodiment of this invention contains about 45% by volume of water, about 36.7% by volume foaming agent (e.g., ammonium lauryl sulfate), and about 18.3% by volume of the pre-mixed microbe solution. In some embodiments, the pre-mixed microbe solution itself contains surfactants to disperse and extinguish the fire and facilitate the decomposition of the volatile organic compounds by the microbe cultures. Stabilizers, preservatives, perfumes, and deodorants may optionally be included with the microorganism culture (microbes).

A preferred embodiment of the present invention is a formulation which will not only put out the fire, but reduce the hazard of re-ignition by forming a film and also will biodegrade the organic fuel that may have caused the fire through microbial decomposition of the most volatile organic wastes, particularly those of hydrocarbon fires. The end product of this decomposition is carbon dioxide, non-ionic water soluble products, and new microbial biomass. It has been found through testing that the microbes of the bioremediating component of the present invention are effective in remediating many components of fluorinated surfactant formulations, such as found in Aqueous Film Forming Foam (AFFF) formulations.

The motivation for developing a formulation which included microbes for extinguishing fires was founded on an appreciation for the severe environmental impact the oil field fires and spills were having on the soil in Kuwait in the aftermath of the Persian Gulf War. A particularly hardy strain of bacteria that would be able to withstand the heat of a fire site immediately after extinction of a hydrocarbon fire was sought for the purpose of determining how soon after the conventional extinction of the flame a bioremediating solution could be applied and still survive in sufficient numbers to perform their function. Because of the time for emergency response where fire-fighting equipment is readily available is typically a short period, and because the procedure for testing the effectiveness of fire-fighting foams involves application after only thirty (30) seconds from ignition, the temperatures which microbes would be subjected to are quite low—there was little or no concern that the microbe population would be severely curtailed when subjected to this relatively low level of heat. Later tests confirmed this belief—when subjected to "30 second" blaze tests, microbe survivability after extinction of the flames was as high as 66 percent. However, in Kuwait, where fires raged for several days before extinction, temperatures of the fire site immediately after the extinction of the flames were substantially higher, as high as 1800 degrees Fahrenheit in some instances. In addition, the ordinary ground temperatures in Kuwait average about 120 degrees Fahrenheit.

Recognizing the duty to help remediate the ecological catastrophe in progress in Kuwait, and the unique opportunity to conduct experiments in the severest of all earthly environments, trials using a spill-control formulation comparable to that of the present invention were commenced with rather surprising results. Not only did approximately thirty-three (33) percent of the microbes of the formulation survive the intense heat, but the formulation extinguished the fire within a period of time which indicated that the formulation might be effective as a fire-fighting agent, despite the fact that no foaming agents were present in the formulation at this time. Again, this was an unexpected result—the goal of the application was merely to determine how soon the bioremediating agents could be applied to begin to decompose the organic compounds. Early analysis of the constituents of the formulation showed that the manufacturer of a proprietary constituent had permitted some residual alcohol to remain in the formulation. Alcohol of course is a combustible and its presence was not beneficial to the goal of extinguishing the flames. The alcohol was subsequently removed from the proprietary constituent with the result being improved fire-fighting characteristics of the formulation. It was also observed that the heat of the fire site shortly after the extinction of the blaze caused the sporogenous microbes to come out of spore and begin the work of decomposing the waste in a foreshortened period of time.

It should be emphasized that the microbes in the formulation do not help extinguish the fire—water, such as for example, the water held on the top of the burning fuel by the foam-forming surfactant contained in the fire extinguishing component of the formulation actually extinguishes the flames and cools the surface of the organic waste (oil, the crude and the sludge) sufficiently to permit one-third of the bacteria applied to survive. Ordinary procedure in extinguishing fires is to overspray and to continue to apply the foam for at least one minute after the flames are extinguished. It is at this point that most of the surviving microbes are injected into the hazard. The surfactants in the formulation break down the volatiles, thereby preventing flashback or re-ignition. It does this in part by dispersing the volatile materials through the reduction of its surface tension and subsequent encapsulation of each dispersed droplet of the organic compounds by surfactant molecules. In addition, in the period of time beginning immediately upon application and extinction of the flames, it is the surfactant containing component and not microbial decomposition which prevents the flashback through a mechanism which breaks down the compounds, changing the molecular structure of some of the most volatile compounds such that the flash point is greatly reduced.

After extinguishment, the microbes of the present invention begin decomposition of the volatile hydrocarbon or organic compounds which cause the fire. After extinction of the flames, the presence of the surfactant continues to have a synergistic effect by aiding in the biodegradation process by cleaning away and dispersing the oil particles so that more surface area is exposed to organics-consuming microbes, thereby speeding the process of decomposition. The volatiles are then broken down even further through microbial decomposition such that they no longer constitute an immediate threat of re-ignition.

The use of the formulation of the present invention also reduces cost as it may no longer be necessary to mechanically remove contaminated soil after the fire is extinguished—the formulation continues to remediate the products of the spill as long as the area is sufficiently moist, breaking the organic material down into carbon dioxide, water-soluble products and new biomass.

One aspect of this invention was the selection of bioremediation agents and, in particular, sporogenous microbe strains mentioned above which (1) are stable in a surfactant of sufficient strength to extinguish the flames and (2) able to survive the intense heat associated with such a fire site after extinction of the flames such that a significant population of the microbes are present and activated to begin the decomposition of the volatiles.

A goal of the present invention is to provide a combination of fire extinguishment and on-site bioremediation. Foam is desirable as an extinguishment medium to help get through the heat due to its insulating characteristics, thereby protecting the bacteria, and as a medium to transport the surfactant and the microbes to the source of the fire. The foam acts as an effective carrier for the water, microbes and possibly other surfactants and chemical antioxidant such that when it covers an area, the water is able to stay on the surface of the organic thereby extinguishing the flames. Surfactants contained therein are able to interact directly with the combusting surface of the organic compounds and may aid in extinguishment. Subsequent to the extinction of the flames, the activated microbes drop out of the foam and onto the volatiles immediately commencing the decomposition process—the microbes come out of spore and begin to attack the source of the fire, converting it into carbon dioxide, water-soluble products and microbial biomass.

Because of the beneficial effects of foam cited above, ammonium lauryl sulfate (ALS) may be added as a constituent to aid in the formation of foam. It should be understood that it will be readily apparent to those of ordinary skill in the art to use substitute foaming agents, in place of or in addition to ALS. However, ALS may be desirable for its effectiveness as well as its non-toxicity as is evident from its prevalent use in personal hygiene products such as shampoos. Environmental friendliness is also a consideration of the present invention—with certain formulation embodiments of the present invention it has been determined that substantially all of the constituents will biodegrade in about thirty (30) days time, including surfactants and other constituents of foaming agents. However, it has been discovered that better protection against re-ignition or flash over is provided by a film-forming foam fluorinated surfactant and with the appropriate bioremediation agent, a composition AFFF can be made that is more environmentally friendly than ordinary, prior AFFF compositions.

An object of the present invention is a fire-fighting formulation having the capability to enhance the bioremediation of most components of a fluorinated surfactant either already present in the environment more advantageously or to bioremediate fluorinated surfactant contained in the present AFFF formulation itself when it is applied to a fire site. A fire site for present purposes is a location where there is increased risk of a fire or where a fire has occurred.

DETAILED DESCRIPTION OF THE INVENTION

An object of the present invention is to provide fire-fighting formulations effective in both fire extinguishment and subsequent bioremediation. Harnessing the power of microbes is hampered by the lack of control over growth and reproductive rates. Generally, the invention provides mixtures including stabilized bioremediating components, surfactant foaming agents and their combined use for fire-fighting and fire site remediation purposes.

According to a first object of this invention there is provided a process for extinguishing an organically fueled fire and for treating a fire site by applying a combination fire extinguishing and a bioremediating formulation to the fire site. In one formulation, a mixture of water, foaming agent and (commercially available) pre-mixed microbe solution is prepared through a process comprising mixing one part microbiological fire-fighting formulation with about 10 to about 100 parts of ordinary tap water. The process further comprises applying this mixture in sufficient quantity to cover the combusting area using for example, a fire truck pumper with a 1.5 inch hose at 90 to 125 psi and an eductor. After the extinction of the flames and inerting the volatiles, the fire site may be cleaned by rinsing down the substrate with ordinary tap water so that the waste water and decomposing hydrocarbon biomass drains away. The presence of surfactant provides the primary fire-extinguishing agent and its selection is such that it is innocuous to the microbes used. The surfactant used is later consumed to a large extent by the microbe cultures which are a constituent of the invention's formulation.

According to a second object of the invention, there is provided a process for treating soil contaminated by waste organic material such as grease, petroleum or petroleum products which is left behind after an organically fueled fire has been extinguished. After extinguishment, remaining fire-fighting foam may be left to digest the residual surfactants and any remaining contaminants. Although the foam may dry before it completely remediates the spill, the selection of the bacteria is such that about 80% of the microbes will survive and go back into spore, remaining idle but viable in this resting state. When the ground is moistened once again (e.g., it rains) and the food source is still present, the microbes will come out of their spores and continue to bioremediate the spill until all of the materials that constitute a food source (the spill product) is completely digested or until the area dries out again. If the area is kept wet, the microbes would likely consume a large percentage of the remaining organic compounds in the next two-week period. This will vary of course, depending on the The microbiological strains mentioned above are selected because of their hardiness in that they are to a large extent stable in a surfactant capable of extinguishing a typical organically fueled fire, they are sporogenous such that sufficient numbers are able to survive the extreme conditions of the fire, and they have an ability to decompose both the compounds of the surfactant used and a particular type of waste found in the typical hydrocarbon spill. The concentrated mixture may contain about 50 to 200 billion microbes per quart. Although the proportion of each microbiological strain in the bioremediating component may be varied according to the composition of organic materials to which the solution is applied. It has been found to be advantageous to have available a mixture having a range of different microbes. The species that are fed by the fuel will reproduce more rapidly so that many of the types of fire hazard or waste site material can be efficaciously remediated. As the microbes of a particular microbiological species attack and decompose a component of the spill, those microbes grow and reproduce. If a particular component is not present in the spill, the microbiological strain that would require that component will become a smaller component and ultimately will either sporulate or die out.

In one embodiment of the present invention a pre-mixed microbe-surfactant solution may be used. As used herein, the term "pre-mixed microbe-surfactant solution" refers to commercially available aqueous microorganism culture concentrates. Such solutions may include surfactants and, according to need, a stabilizer, a preservative and a perfume added to the microbial strains to assist in the decomposition of organic matter and cleanup of hydrocarbon waste. The concentrations of constituents used in alternate embodiments of the present invention may be provided in part depending on use of commercial pre-mixed micro-surfactant formulations. In one embodiment, BI-CHEM GC600L 6X (Sybron, Inc., Salem, N.J.) is the source for microbes and the pre-mixed microbe solution further contributes surfactants, stabilizers, and preservatives. In embodiments preferred for use in mixtures with fluorinates surfactant for increased film-forming foam, the premixed microbe solution may be non-formulated ("NF") and lack additional components such as, for example, stabilizers, preservatives and perfumes.

In one embodiment, a pre-mixed microbe-surfactant solution of this invention may include about 54% to about 66% aqueous bacteria culture, up to about 1.7% stabilizer, from about 17% to 21% surfactant, and up to about 2% preservative, the balance being water. The microbial strains present in the aqueous bacteria culture were selected because they are capable of decomposing the organic matter found in grease and waste petroleum products. In this embodiment, the stabilizer may be present to maintain the microbe population substantially constant until the microbe solution is brought into contact with waste organic compounds which act as food for the microorganisms. The preservatives prevent destruction of the bacteria culture by toxic organisms. The surfactant acts as the primary fire-extinguishing agent, the initial inerting agent, as a dispersant, and as a cleaning agent and is an important ingredient of this invention. Because of the requirement that it coexist with sporogenous bacteria in either a spore state or in an active state, the surfactant must be innocuous to the organics-consuming bacteria cultures used. The surfactants specifically identified in this specification are all substantially innocuous to the microbes selected.

A surfactant by definition is a substance which alters the surface tension of water, and there are traditionally three types: nonionic, anionic, and cationic. A fourth type which under certain conditions may be anionic or cationic is known as amphoteric. It is the nature of a surfactant molecule to have one end which is hydrophilic and the other hydrophobic. Those skilled in the art may determine specific examples of various surfactants useful in any of the above classes. In one preferred embodiment, the preferred class of surfactants for the practice of this invention is a nonionic surfactant, or a mixture thereof. Under certain conditions, non-ionic surfactants are desirable because they have been found to be an effective fire-extinguishing agent, to be innocuous to certain organics-consuming bacteria used in the formulation of this invention, and because it is also consumed by the organics-consuming microbes over a reasonable period of time.

Specific examples of nonionic surfactants are compounds which are formed by reacting alkylphenols, particularly octyl- or nonylphenols, with ethylene oxide. Those in common use include Triton series (Union Carbide Corporation), the Igepal series (Phone-Poulenc Corporation), the DeSonic series (Witco Corporation), the Hyonic series (Henkel Corporation), all those of the chemical class ethoxylated alkyl phenol, the Glucopon series (Henkel Corporation) and all those of the chemical class polysaccharide ether. Specific examples include DeSonic 4N, Triton X-100, Igepal Co-630, Igepal Co-730, Hyonic NP-90, Glucopon 225, Glucopon 425 and Glucopon 625. The average number of ethylene oxide molecules attached to each molecule of alkylphenol is between 1 and 12 per molecule of octyl- or nonylphenol. When the ethylene oxide molecules are between 1 and 4, the surfactant is immiscible in water, whereas if the average number of ethylene oxide molecules attached is between 4 and 6, the surfactant is dispensable in water, and 7 or above, soluble. The preferred nonionic surfactant of those above are those soluble in water—these surfactants have an average of from 8 to 12 molecules ethylene oxide per molecule of alkylphenol. This includes a surfactant which is an alkylphenol and ethylene oxide derived molecule having at least 7 to about 15 ethylene oxide moieties per alkylphenol moiety. Other nonionic surfactants may include ethylene oxide adducts of fatty acids, amines or other substances and their derivatives with ethylene oxide.

Examples of cationic surfactants which may be considered for use in this invention are those liquids formed from the quaternary ammonium chloride derivatives of polypropoxy tertiary amines.

A specific example of anionic surfactant which may be useful is octylphenoxypolyethoxyethylphosphate (a phosphated ethylene oxide adduct of octylphenol), a material sold by Rohm and Haas Company (Philadelphia, Pa.) under the trademark TRITON QS-44. This anionic surfactant may be in a free acid form or as an alkali metal salt, preferably the sodium salt. The active ingredient in other anionic surfactants which may be tested for use in the present invention is sodium dioctylsulfosuccinate. While specific suitable and suggested possible nonionic, cationic and anionic surfactants have been set forth, the surfactants which may be used in the present invention are not limited to those specifically discussed. The foregoing illustrate that water soluble surfactants which are effective at a substantially neutral pH (from about 5 to about 9) are preferred according to the present invention. The selection of the pH is important to avoid an environment damaging to the maintenance of the viability of the microbes. The preferred pH range for the formulation is about neutral, i.e., from about 6 to about 8. However, the concentrate will function when pH is adjusted within a range of about 4 to 11.5.

Examples of fluorinated surfactants include LODYNE S-152B (Ciba Specialty Chemicals, High Point, N.C.) and ZONYL FSA Fluorosurfactant (DuPont Chemical, Wilmington, Del.).

Stabilizers and preservatives added to maintain the microbe population until applied to waste organic compounds are routinely selected by suppliers of microbes and are not themselves part of this invention. The selection is within the ability of those of ordinary skill in the art. The presence of stabilizers and preservatives enhances the storage life of the invention. It has been found that reducing or eliminating inorganic nutrients enhances the storage life by avoiding partial activation of the sporogenous bacteria. An indefinite shelf life has been achieved in the concentrated mixture based on tests of microbe viability over time.

In one embodiment, the formulation uses pre-mixed microbe-surfactant solution GC 600L 6X, (described below), which is understood to comprise about 60% by volume aqueous bacteria culture, up to about 1.5% by volume stabilizer, about 19% by volume surfactant, and up to about 2% by volume preservative. The aqueous bacteria culture (bacteria spores in water) comprises *B. subtilis, B. licheniformis,* and *B. polymyxa.* A suitable aqueous bacteria culture is supplied by Sybron, Inc. (Salem, N.J.) and is sold under the trade name BI-CHEM Spore Concentrate (P). It contains between $12 \times 10^7$ and $14.2 \times 10^7$ CFU/ml (CFU is colony forming units). The stabilizer is sodium hydroxide or opacifier (e.g. WITOOPAQUE R-11 from Emulsion Systems); the preservative is a mixture of 1,2-benzisothiazolin and dipropylene glycol; and the nonionic surfactant may be an EO adduct of an alkylphenol such as TRITON X-100 (supplied by Rohm & Haas) or NP-9 and NP-13 (supplied by Emery). Perfume may optionally be added as a deodorizer to improve smell.

EXAMPLE 1

One embodiment of a fire-fighting composition provides a formulation useful for forest and/or brush fires and commercial or residential building fires, comprising approximately 55 parts GC600L 6X (the composition of which is described above), 110 parts ammonium lauryl sulfate and 135 parts water or, preferably, an aqueous solution comprising nutrients such as nitrogen, phosphorous, and/or potassium. The concentrate thus formed remains stable in storage indefinitely and, when premixed with 97 to 99 parts of water (a 1% to 3% soln), produces an effective fire-fighting agent which may be sprayed directly on the fire using for example, a 1.5 inch hose at 90 to 120 psi. Alternatively, the formulation may be applied using an eductor, a mechanism used to pull the concentrate material into the water stream from a concentrate container. The formulation has been observed to extinguish the flames on contact without substantial danger of flashback.

EXAMPLE 2

One embodiment of a fire-fighting composition provides a formulation useful for crude oil fires, comprising approximately 55 parts GC600L 6X, 110 parts ammonium lauryl sulfate and 135 parts of an aqueous solution comprising a small quantity of inorganic nutrients such as nitrogen, phosphorous, and potassium. The concentrate thus formed remains stable in storage for at least 12 months and, when diluted with 94 to 97 parts by volume of water (a 3% to 6% soln), produces an effective fire-fighting agent which may be sprayed directly on the fire using for example, a 1.5 inch hose at 90 to 120 psi (note: it is contemplated that the injection of air into the mix immediately before application will enhance foam production such that the percentage of ALS in the formulation may be substantially reduced). The formulation has been observed to extinguish the flames on contact without substantial danger of flashback.

On a volumetric basis, a formulation of the present invention relates to a microbiological fire-fighting formulation of inorganic nutrients, foaming agent and bioremediating component comprising about 45% by volume of aqueous inorganic nutrients solution, about 36.7% by volume foaming agent (e.g. ALS) and about 18.3% by volume pre-mixed microbe-surfactant solution (e.g. GC600L 6X), wherein the pre-mixed microbe-surfactant solution comprises a surfactant, a stabilizer, a preservative and a microorganism culture. After mixing the nutrients solution, the foaming agent and the pre-mixed microbe-surfactant solution in the amounts as disclosed above, the mixture comprises about 9% to about 12% by volume bacteria culture, up to about 0.28% by volume stabilizer, about 3% to about 5% by volume surfactant, and from 30% up to about 36% by volume foaming agent. Of course, trace amounts of the nutrients of the inorganic nutrients solution are also present in the mixture. In this formulation of the invention the microbe-solution comprises a nonionic surfactant, a stabilizer, a preservative and a microorganism culture. In addition, it should be noted that the composition as described above wherein the percentage of foaming agent is reduced to as low as 10% (the deficit being made up by increasing the volume of bacteria culture) has been tested with satisfactory though less than optimal results.

EXAMPLE 3

According to another example, a microbiological fire-fighting formulation comprises about 18.3% by volume BI-CHEM GC 600L 6X, about 36.7% by volume ammonium lauryl sulfate (a foaming agent), and about 45% water by volume, having small quantities of inorganic nutrients in solution. Normal strength BI-CHEM GC 600L is comprised of 10% by volume BI-CHEM spore concentrate (P); 3.2% by volume nonionic surfactant such as TRITON X-100, NP-9 or NP-13; 0.25% opacifier spore stabilizer such as WITOOPAQUE R-11 or sodium hydroxide; and 0.3% perfume such as 86F/471 (by Fragrance Resources, Keyport, N.J.), 407322 (by Fragrascent Neumark Extra, by Ingredient Tech Corp., Des Plaines, Ill.) or Arylene N. Fragrance (by Arlyessence, Inc.), with the balance being water. A preservative may optionally be used. GC 600L 6X as used in this example is a concentrate of GC 600L (6 times normal concentration) and is readily available on the market. However, in the formulations of this example, a trace amount of alcohol which is normally a constituent in the commercially available product is removed by the manufacturer by request prior to use in the composition.

The ALS used in the formulation of this example is comprised of about 30% to 33% ammonium lauryl sulfate solution having a specific gravity of 1.05 at 25 degrees C.

Opacifier present in GC600L 6X is a stabilizer which helps ensure that the microbes remain in spore while in storage and until applied to the organic compounds to be consumed. When diluted with water or inorganic nutrients solution, the concentration of stabilizer remains sufficient to keep the microbes in spore until an organic food source is available. When the microbes are excited by the presence of an organic food source, they then become activated and are able to begin the decomposition of organic wastes.

The perfume used in this example formulation is, of course, optional. It has been found that the pleasant masking odor of the perfume may help in improving the working environment around a spill for the emergency response personnel.

EXAMPLE 4

An additional example of a fire-fighting formulation comprises one quart GC600L as bioremediating component to one gallon LODYNE S-152B (3% by volume) as the fire-fighting component may be combined to comprise a formulation of the present invention.

EXAMPLE 5

An example of a formulation that increases film-forming characteristics to a certain extent includes the following components:

55 gallons of GC600L 6X;

110 gallons of ALS;

10 pounds polymer;

3 gallons ZONYL FSA Fluorosurfactant; and 135 gallons water.

Procedure: Combine all materials in the tank of a shearing machine. Let materials shear for 30 minutes. Additionally, the mixture may be transferred to and further mixed in a packaging tank until foam and remaining solids are substantially gone.

Polymers as used in this embodiment may include various polysaccharide compositions. An example of one such polymer suitable for use in the present example is KELZAN (Kelco Oil Group, Houston, Tex.). Polymers are used in fire-fighting formulations to emulsify and suspend ingredients and to maintain homogeneity of the mixture. In this specific formulation, it is preferred that the polymer used be at least about half (5 pounds) KELZAN.

At the time of application to a fire, the composition is mixed with water preferably in the ratio comprising one part by volume formulation and between 17 parts and 100 parts by volume water, depending on the type of fire to be extinguished. Additionally, the diluted formulation may be turbulated prior to application to the fire.

The examples given are to aid in the practice of this invention and is for the purposes of illustration only and should not be construed as being limiting on the overall scope of the invention described and claimed.

EXAMPLE 6

A representative test comparing the effectiveness of the formulation of the present invention with AFFF (3M Company) was conducted at the Brayton Fire Field at Texas A&M University. A 21-foot diameter (346 square feet surface area) steel tank is filled with 65 gallons of diesel and 15 gallons of gasoline. The fuel is ignited and allowed to burn for 30 seconds prior to an attempt to extinguish the flames. The equipment used to apply a 3% solution of MICRO BLAZE OUT fire-fighting foam includes a pressure nozzle set midrange at a 95 gallons per minute (therefore, 3.6 GPM/square foot) dispense rate using a straight stream. Result is an extinguishment time of 30 seconds.

AFFF testing under the same conditions extinguished the flames in a comparable period of time, but at a product cost 20% greater than the MICRO-BLAZE OUT used. In addition, the use of AFFF raises environmental concerns, possibly requiring mechanical removal at considerable additional expense.

Variations of the formulation used in the this Example above can be prepared by altering the relative amounts of ingredients and/or by replacing them with functionally similar ingredients. Formulations have been prepared with greater and less amounts of ALS, and inorganic nutrients with acceptable, although not optimal results.

The order of the ingredients added and mixing technique are not particularly important. However, the typical preparation of the formulation proceeds as follows: first, one fifty-five (55) gallon drum of GC 600L 6X is placed in a three hundred (300) gallon mixing container. To this is added one fifty-five (55) gallon drum of the ALS. Then fifty-five (55) gallons of water with a small quantity of inorganic nutrients solution is added. Another fifty-five (55) gallon drum of ALS solution is added. The balance of the 300-gallon formulation is made up of either water or inorganic nutrients solution. The container is then capped off and mixed. It is then ready to ship. At the site, it may be diluted with water in an amount depending on the application for which it is to be used. The pH of the formulation remains about neutral, and is rarely above 8. It has therefore not been observed to be necessary to control the pH of the formulation. However, if pH control is necessary, pH may be adjusted using NaOH or HCl.

It is contemplated that additives may be used to enhance the bubble stability of the foam. In addition, it is likely that any number of known freezing point depressants may be added to the basic formulation to help prevent freezing of the concentrate. The additives used in the formulation of this invention are those which exhibit minimal adverse environmental and toxic effects. It is anticipated that these environmentally safe components could be replaced by less desirable agents, if necessary, without substantially diminishing the functionality of the invention.

The basic formulation is diluted to a range of from approximately 1% to 6% with water prior to turbulation to produce foam. The preferred dilution is dependent on the type of fire, but a relatively wide range is functional. At 3% (i.e., 97 parts per hundred volume of water) dilution, the solution produces a quality foam which is highly cost effective.

EXAMPLE 7

Another specific formulation with improved storage life, good foam-forming and good bioremediation for many organic fuels is:

18.3 gallons of GC600L 6X (that contains three strains of Bacillus bacteria);
36.7 gallons of ALS;
1.17 pounds KELZAN; and
45 gallons water without inorganic nutrients.

EXAMPLE 8

In one embodiment, the pre-mixed microbe-surfactant fire-fighting formulation of this invention includes an aqueous mixture having a plurality of different nonpathogenic, sporogenous bacteria species together with a fluorinated surfactant. Depending on the constituents of commercially available fluorinated surfactant formulations, at least one glycol ether and/or polysaccharide gum may be added to improve the homogeneity of the formulation during storage and to enhance foam quality. Water is used to make up the remainder of the total volume as the quantity of individual constituents is varied.

In one embodiment found to be efficacious, the bacteria constitute a mixture selected from among six strains of spore-forming Bacillus, *B. subtilis, B. polymyxa* (now *Paenibacillus polymyxa*), *B. licheniformis, B. amyloliquifaciens, B. pasteurii* and *B. laevolacticus* Preferably, a plurality of the strains are selected to facilitate bioremediation of a variety of organic compounds. Tree strains may be conveniently obtained in a stock solution designated "G C 600 L 6X" from Sybron Chemicals Inc., 111 Resler Mills Road, Salem, Va., namely *B. subtilis, B. polymyxa* (now *Paenibacillus polymyxa*) and *B. pasteurii*. Four of these strains, *B. licheniformis, B. amyloliquifaciens, B. pasteurii* and *B. laevolacticus*, can be obtained as a stock solution designed "MSB 10x NF" from Sybron Chemicals Inc., 111 Resler Mills Road, Salem, Va. With addition of *B. subtilis, B. polymyxa* (now *Paenibacillus polymyxa*) to "MSB 10X NF" by Sybron, the bacterial stock comprises a preffered aqueous solution of the six strains at a concentration of about 600 billion ($6\times10^{11}$) viable bacteria per gallon in the presence of 1–3% chelating agent (tetrasodium ethylenediaminetetraacetate, CAS No. 64-02-8).

In a preferred embodiment, approximately 5–15 gallons of the bacterial stock solution are used per 100 gallons of total fire-fighting formulation. The total amount of bacterial stock can vary depending in part on the concentration of bacteria in the stock solution. The type, number and/or concentration of individual constituent bacteria used can vary and still be in accordance with the scope of the present invention. Other microorganisms suitable for use in the present invention may be substituted where such microorganisms comprise at least the following characteristics: 1) the ability to at least partially degrade flammable organic materials; 2) the ability to remain viable in fire-fighting foam-forming compositions; and 3) lack of pathogenicity in humans of normal vulnerability.

Without limiting the scope of the present invention as other fluorinated surfactants may be applicable, examples of commercially available fluorinated surfactant formulations found to be useful in the present embodiment include LODYNE S-152B or ZONYL FSA Fluorosurfactant. The final concentration range of fluorinated surfactant added to the fire-fighting formulation is from 12–20%, a concentration of either LODYNE or ZONYL of 15% (or 15 gallons per 100 gallons) has been found to be particularly efficacious. This also represents the current maximum level of fluorinated surfactant permitted according to military specifications. The concentration of surfactant effects the quality of the foam and the film formed as the foam concentrate mixed with water is thrown from the fire-fighting nozzle. As desirable foam characteristics may differ depending on the type of flammable material fueling the fire, different absolute concentrations of surfactant constituents are contemplated as within the scope of this invention.

LODYNE S-152B as currently formulated includes: 3–7% by weight per fluorotelomer (CAS No. 70969-47-0); 3.5% by weight hexylene glycol (CAS No. 107-41-5); 2% tert-butyl alcohol (CAS No. 75-65-0); 5–9% by weight of a proprietary fluorochemical anionic surfactant; and 1–5% by weight of a proprietary fluorochemical cationic surfactant.

ZONYL FSA as currently formulated includes 23–25% lithium 3-[(1H, 1H, 2H, 2H-fluoroalkyl) thio] propionate (CAS No. 65530-69-0); 0–2% telomer B 2-carboxyethyl sulfide (CAS No. 65530-83-8); 35–40% isopropyl alcohol (CAS No. 67-63-0); 35–40% water No. 7732-18-5); and <1% lithium salts (CAS No. 7439-93-2).

In the present embodiment when the fluorinated surfactant formulations ZONYL FSA or LODYNE S-152B are used, other surfactants are unnecessary and may cause incompatibility. Thus, additional surfactants such ALS or surfactants present in the bacterial stock solutions are excluded from the formulation of this example. However, it is contemplated that other fluorinated surfactant compositions or formulations may be employed in which additional surfactants may be both compatible and desirable.

In the present embodiment of the present invention when the fluorinated surfactant formulations ZONYL FSA or LODYNE S-152B are used, a glycol ether is added. The glycol ether used in a preferred embodiment of the present invention is diethylene glycol mono-butyl ether (CAS No. 112-34-5) manufactured by Equistar Chemicals, Houston, Tex. The glycol ether is added to a final concentration range in the fire-fighting formulation of about 13–22% by volume, a concentration of 17% by volume has been found to be particularly efficacious. Other compounds able to perform the equivalent solvent or water-based coupling roles of the present glycol ether may be substituted where suitably compatible with the other constituents. By "suitably compatible" is meant, not toxic to the microbial constituents at the concentration used and not destructive of foam quality.

As used in the present embodiment, a polysaccharide gum, preferably Xanthan gum (CAS No. 11138-66-2) is added. Several different Xanthan gum formulations are suitable for use in the present fire-fighting formulation including for example KELZAN and XANVIS, obtainable from the Kelco Oil Field Group unit of Monsanto. KELZAN and XANVIS may be used in the range of approximately 1–7% weight per volume (i.e., 1–7 lbs./100 gal.) of fire-fighting formulation. A concentration of 3–4 lbs. of Xanvis/100 gal. total volume has been found to be particularly efficacious.

EXAMPLE 9

A preferred specific formulation according to one embodiment of the present invention is:

| | |
|---|---|
| 10 | gallons of MSB 10x NF + B. subtilis & polymyxa (6 × 10$^{11}$ viable bacteria/gallon); |
| 15 | gallons LODYNE Fluorosurfactant; |
| 17 | gallons diethylene glycol mono-butyl ether; |
| 3.25 | pounds Xanvis; and |
| 58.00 | gallons water. |

EXAMPLE 10

Another effective specific formulation according another embodiment of the present invention is:

| | |
|---|---|
| 6 | gallons of MSB 10x NF + B. subtilis & polymyxa (6 × 10$^{11}$ viable bacteria/gallon); |
| 15 | gallons LODYNE Fluorosurfactant; |
| 15 | gallons diethylene glycol mono-butyl ether; |
| 2.3 | pounds Xanvis; and |
| 62.00 | gallons water. |

Procedure for the Examples set forth above: Combine all materials in the tank of a shearing machine. Let materials shear for 30 minutes. Additionally, the mixture may be transferred to and further mixed in a packaging tank until foam and remaining solids are substantially gone.

The advantages of the present invention have been clearly presented. The formulation of the invention as described above and in the claims below provides a fire-fighting foam and residual spill control agent which can be stored indefinitely and dispensed as required from conventional fire extinguishing devices. The formulation begins to work immediately, extinguishing the fire and breaking down some of the most volatile organic materials in only a matter of minutes. Preferably a bioremediating fire fighting aqueous film forming foam is created that extinguishes the fire, produces a film to suppress re-ignition or flash-over, and bioremediates the AFFF and the fuel for the fire. This enables the stabilization of volatile surfaces in a short period, decreasing the immediate danger of explosion or ignition and thereby protecting lives and property. This ability is enhanced by the presence of surfactants in the formulation which begin the process of inerting the volatiles and disperses the organic compounds such that more surface area is exposed for microbial decomposition.

Thus it is apparent that in accordance with the present invention, an improved foamable concentrate and method of mixing same is provided which fully satisfies the objectives set forth above. While this invention has been described with reference to illustrative embodiments, this description is not intended to be construed in a limiting sense. Various modifications and combinations of illustrative embodiments, as well as other embodiments of the invention, will be apparent to persons skilled in the art upon reference to the description. It is therefore intended that the appended claims encompass such modifications and enhancements.

What is claimed is:

1. A composition for extinguishing fires and bioremediating a fire site comprising:
   a foam-forming surfactant component; and
   a bacterial component comprising a plurality of sporogenous nonpathogenic bacteria species.

2. The composition of claim 1 wherein the foam-forming surfactant component comprises at least one fluorinated surfactant to provide an aqueous film forming foam composition.

3. The composition of claim 2 wherein the fluorinated surfactant component comprises a type represented by those manufactured under the brand names LODYNE or ZONYL FSA.

4. The composition of claims 1 or 2 wherein the bacteria species comprise Bacillus chosen from the group consisting of: *B. subtilis, B. polymyxa, B. licheniformis, B. amyloliquiffaciens, B. pasteurii* and *B. laevolacticus*.

5. The composition of claim 2 further comprising a solvent.

6. The composition of claim 5 wherein the solvent comprises a glycol ether.

7. The composition of claim 6 wherein the glycol ether comprises a diethylene glycol n-butyl ether.

8. The composition of claims 1 or 2 further comprising a stabilizing and thickening agent.

9. The composition of claim 8 wherein the stabilizing and thickening agent comprises a polymer.

10. The composition of claim 9 wherein the stabilizing and thickening agent polymer comprises a polysaccharide gum.

11. The composition of claim 10 wherein the polysaccharide gum comprises a xanthan gum.

12. The composition of claim 11 wherein the xanthan gum comprises a preparation of xanthan gum similar to that marketed under the trade names KELZAN or XANVIS.

13. A film-forming foam fire-fighting and bioremediating composition comprising:
   a) a fluorinated film-forming foam surfactant component;
   b) a bioremediating bacterial component comprising at least one sporogenous nonpathogenic bacteria species;

c) a glycol ether; and d) a xanthan gum.

14. The composition of claim 13 wherein the at least one nonpathogenic bacteria species comprise a plurality of nonpathogenic Bacillus strains chosen from a group consisting of: *B. subtilis, B. polymyxa, B. licheniformis, B. amyloliquifaciens, B. pasteurii* and *B. laevolacticus.*

15. The composition of claim 13 wherein the plurality of Bacillus consist of at least three species from the group.

16. The composition of claim 13 wherein:

a) the fluorinated foam-forming surfactant component has a concentration of about 12–20% by volume in the composition;

b) the total number of viable bacteria in the composition is in the range of about $1\times10^9$ to about $5\times10^{11}$ per gallon;

c) the glycol ether has a concentration of about 13–22% by volume in the composition; and d) the xanthan gum has a concentration of about 1–7% weight per volume in the composition.

17. A foam-forming fire-fighting and bioremediating composition comprising, in aqueous solution:

a) an ALS foam-forming surfactant at a concentration of from about 30–40% by volume;

b) a bioremediating bacterial component comprising from 10–25% per volume GC600L 6X; and c) a polysaccharide gum component comprising from 1–4% weight per volume d) of xanthan gum.

18. A mixture useful for extinguishing fires and bioremediating a fire site of the type having an organic fuel, said mixture comprising an aqueous solution of:

a) a film forming foam, fluorinated surfactant; and b) an aqueous solution of a bioremediation agent in mixture with said fluorinated surfactant, said bioremediation agent characterized as being inactive in storage in an aqueous solution mixed with said fluorinated surfactant and becoming activated upon contact of said mixture with said organic fuel, and wherein said activated bioremediation agent is nonpathogenic to humans with normal immune response.

19. The mixture of claim 18 wherein said bioremediation agent comprises at least one sporogenous bacteria.

20. The mixture of claim 18 wherein said form-forming surfactant comprises a fluorinated surfactant of a type represented by those manufactured under the brand names LODYNE or ZONYL FSA.

21. The mixture of claim 19 wherein said nonpathogenic Bacillus comprises a plurality of strains selected from a group comprising *B. amyloliquifaciens, B. laevolacticus, B. licheniformis, B. pasteurii, B. polymyxa* and *B. subtilis* subsp. subtilis.

22. The mixture of claim 19 wherein said nonpathogenic Bacillus bacteria comprises a mixture of at least four different strains of Bacillus bacteria.

23. The mixture of claim 19 wherein said nonpathogenic Bacillus bacteria comprises a mixture of at least six different strains of Bacillus bacteria.

24. The mixture of claim 23 wherein said mixture of at least six nonpathogenic Bacillus bacteria comprises *B. amyloliquifaciens, B. laevolacticus, B. licheniformis, B. pasteurii, B. polyinyxa* and *B. subtilis.*

25. The mixture of claim 18 further comprising a polymeric thickener.

26. The mixture of claim 25 wherein said polymeric thickener comprises a polysaccharide gum such as xantham gum or xantham gum derivative.

27. The mixture of claim 26 wherein said polymeric thickener comprises a xantham gum selected from a group consisting of xanthum gums marketed under the trade names KELZAN and XANVIS.

28. The mixture of claims 18, 20 or 25 further comprising diethylene glycol n-butyl ether.

29. A mixture useful for extinguishing fires and bioremediating a fire site comprising an aqueous solution of:

a) about 10%–30% by volume of a fluorinated foam-forming surfactant;

b) about 5%–20% glycol ether;

c) about three trillion to twelve trillion sporogenous bacteria in an aqueous solution;

d) about 1%–5% by weight per volume polysaccharide gum; and e) about 40%–85% water making up the remainder of a 100% solution.

30. The mixture of claim 29 wherein said mixture comprises:

a) about 10%–20% by volume of a fluorinated surfactant;

b) about six trillion to about nine trillion sporogenous bacteria in an aqueous solution;

c) about one to five by weight per volume xanthan gum; and d) about 45%–90% water making up the remainder of a 100% solution.

31. The mixture of claims 29 or 30 wherein said fluorinated surfactant is selected from a group consisting of fluorinated surfactants marketed under the trade names LODYNE and ZONAL FSA.

32. The mixture of claims 1, 18 or 29 having a pH range of about five to about nine.

* * * * *